United States Patent Office 2,731,983
Patented Jan. 24, 1956

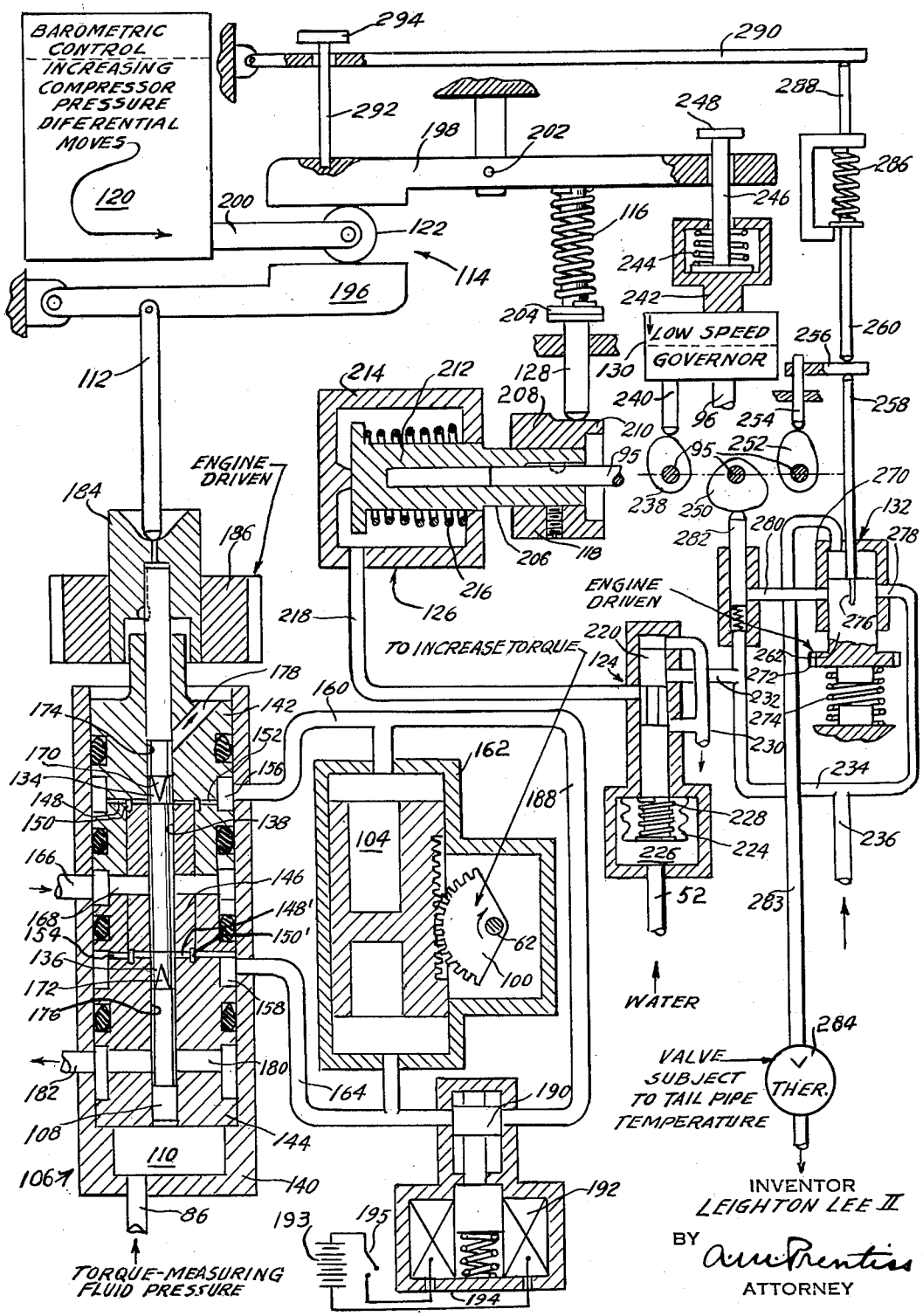

2,731,983
CONTROL VALVE APPARATUS FOR TURBO-JET ENGINE

Leighton Lee II, Rocky Hill, Conn., assignor, by mesne assignments, to Pratt & Whitney Company, Incorporated, West Hartford, Conn., a corporation of Delaware Original application November 21, 1947, Serial No. 787,416. Divided and this application September 17, 1953, Serial No. 380,767

7 Claims. (Cl. 137—622)

The present invention relates to hydraulic control apparatus for an internal combustion engine of the turbojet type, as disclosed in my copending application, Serial No. 787,416, filed November 21, 1947, which matured into Patent No. 2,657,530, and of which this application is a division. Certain features of the invention are of utility in connection with control apparatus generally, while others are useful only in hydraulic control apparatus, and still others are useful only in connection with control systems for internal combustion engines.

The embodiment of my invention described herein is intended for the control of the fuel flow, speed, and output torque of an internal combustion turbine adapted to drive an aircraft by means of a discharge jet and a variable pitch propeller; and more particularly concerns a novel type of fluid motor and valve operating means for actuating the propeller pitch varying mechanism.

The principal objects of this invention are: (1) to provide for manual control of the propeller pitch in emergencies; and (2) to provide compensation for the rate of change of the engine torque to prevent hunting of the control system.

Another general object is to provide, in a control system of the type described, improved response to the rate of flow of air through the engine and to the air density.

Still another general object is to provide hydraulic control apparatus. More specific objects in connection with this general object are to provide improved emergency manual control mechanism, improved mechanism responsive to the rate of change of a controlling condition, and improved valve mechanism for controlling an hydraulic servomotor.

Other objects and advantages of the present invention will become apparent from a consideration of the appended specification, claims, and drawing which is a somewhat diagrammatic illustration of a propeller torque control system which forms a part of the system of Figure 1, of my parent application, Serial No. 787,416, now Patent No. 2,657,530.

There is shown in the drawing the torque regulating mechanism in the control apparatus disclosed in my parent application mentioned above. This mechanism regulates the torque by controlling the pitch of the variable pitch propeller driven by the engine.

In the drawing is shown a shaft 62, corresponding to the shaft 62 in Figure 1 of my parent application mentioned above, whose angular position determines the pitch of the variable pitch propeller. Attached to the shaft 62 is a segmental gear 100, which engages a rack 102 on the side of a piston 104. The piston 104 is subject to fluid pressures applied to its opposite ends, which determines its position. These pressures are controlled by a valve mechanism generally indicated at 106. The valve mechanism 106 includes a piston valve 108 subject on its bottom surface to the torque measuring fluid pressure applied through conduit 86 to a chamber 110. This pressure acts upwardly on the valve 108. The pressure is opposed by a downwardly acting force applied through a rod 112 and a lever mechanism 114 by a spring 116. The force of spring 116 is determined by the angular position of a cam 118. Cam 118 is keyed to the manually operated main control shaft 95.

The torque control is operated primarily in response to the balance or unbalance between the torque measuring fluid pressure in chamber 110 and the force of spring 116. The torque control may also be modified by a barometric control schematically indicated at 120, which varies the position of a bearing 122 in the lever mechanism 114 in accordance with either the compressor inlet absolute pressure, or the differential between the compressor inlet and discharge pressures, or the sum of the compressor inlet and discharge absolute pressures; all of which vary the rate of flow of combustion air through the compressor, as described in my parent application cited above.

Limit controls are also provided which vary the torque control in response to engine speed and engine temperature. The speed limit control includes a governor 130 and the temperature limit control includes a control valve mechanism generally indicated at 132.

The valve mechanism 106 which controls the piston 104 includes the valve 108, which has a pair of lands 134 and 136 separated by a recess 138. The valve mechanism is enclosed within a casing 140. The valve 108 moves within a pair of generally cylindrical seat members 142 and 144. The seat members 142 and 144 are provided with central bores which extend axially through them from end to end to receive the valve 108. Each of these seat members 142 and 144 also has a larger bore concentric with its central bore and extending inwardly from one of its ends. The seat members 142 and 144 are arranged within the casing 140 so that these larger bores face each other. A sleeve 146 is received within the two larger bores.

The sleeve 146 is made slightly longer than the combined depth of the bores in the seat members 142 and 144, so that when the sleeve and the two seat members are assembled, the facing end of the two seat members are held spaced apart by the sleeve. Sleeve 146 has radial grooves 148 and 148' cut in its end faces and annular recesses 150 and 150' at the periphery of each of its end faces. The seat members 142 and 144 are provided with ports 152 and 154 which connect the annular recesses 150 and 150' with external grooves 156 and 158, respectively, in the seat members 142 and 144. Groove 156 is connected to a conduit 160 which leads to the upper end of the cylinder 162 in which the piston 104 moves, and groove 158 is connected through a conduit 164 to the lower end of cylinder 162.

An inlet for hydraulic fluid under pressure is provided in the valve mechanism 106 through a conduit 166 which opens into the space between the seat members 142 and 144. The fluid then passes through one or more radial inlet ports 168 in the sleeve 146 to the recess 138 between the lands 134 and 136 on valve 108. The lands 134 and 136 are provided with flat surfaces 170 and 172, which are of triangular or curved contour so as to provide ports of tapering depth. These triangular or curved flats have their apexes pointed towards the recess 138, while their widest portions open into recesses 174 and 176 on the valve 108. The recess 174 is connected, at all operating positions of the valve 108, through a passage 178 to a drained chamber (not shown). Similarly, the recess 176 is connected at all operating positions of the valve 108 through a drain port 180 and a conduit 182 to a suitably drained chamber.

When the valve 108 is in the position shown in the drawing, all the ports leading to the opposite ends of cylinder 162 are closed by the valve. If the valve moves upwardly from the position shown, then the hydraulic pressure fluid may flow through inlet port 168, recess 138, radial passage 148, passage 150, drain port 152, groove 156, and conduit 160 to the upper end of cylinder 162. At the same time, the lower end of cylinder 162 is connected through conduit 164, groove 158, ports 154, and passages 150' and 148' to the valve 108 and thence through the port formed by flat 172 to the drain recess 176 and out through conduits 180 and 182 to the drain.

The upper end of valve 108 is keyed to a hub 184 which carries a gear 186 driven by the engine through suitable driving mechanism, not shown. The valve 108 is thereby continuously rotated when the engine is running. Hence, when the valve 108 is moved upwardly from the position shown, the upper end of cylinder 162 is continuously connected to the source of fluid pressure, but the lower end of cylinder 162 is connected to the drain only intermittently, as the tapered port formed by flat 172 passes the ports 148 in the sleeve 146. As the distance of valve 108 from its neutral position increases, the width of the port 172 which passes the port 148 on rotation of the valve, increases. Thus, the proportion of the total time during which the pressure is being drained from the lower end of chamber 162 also increases. If the valve 108 is moved upwardly sufficiently far so that land 136 clears the port 148 completely, then the lower end of chamber 162 is continuously connected to the drain, and the piston 104 moves downward rapidly. Because of the intermittent action of the valve, the motion of the piston 104 takes place at a rate which depends upon the distance of valve 108 from the intermediate neutral position shown in the drawing.

The force due to the pressure acting upwardly on the bottom of valve 108 is a measure of the actual torque load on the engine. The force acting downwardly on the top of valve 108 is a measure of the desired torque load on the engine. When the actual torque is not equal to the desired torque, the valve 108 moves to cause operation of piston 104 to restore the actual torque to its desired value. The use of the flats 170 and 172 and the rotation of the valve ensures that the rate of movement of the torque controlling piston 104 is varied in accordance with the amount of departure of the actual torque load from its desired value.

Provision is made for a by-pass connection between the ends of cylinder 162, to permit manual operation of the torque control under emergency conditions. This by-pass includes a conduit 188 connecting the conduits 160 and 164. This conduit is controlled by a valve 190 operated by a solenoid 192. The electrical solenoid 192 may be energized by an electrically connected battery 193, upon closing a switch 195. A spring 194 biases the valve 190 to a position wherein the by-pass is closed. Upon manually closing switch 195, solenoid 192 is energized and overcomes spring 194, whereupon the valve 190 is opened, thereby permitting manual movement of the pilot's pitch control lever connected to shaft 62.

The rod 112 is provided with a rounded lower end, and rides in a similarly rounded crater in the top of hub 184, so as to provide for angular misalignment between the rod 112 and hub 184.

The lever mechanism 114 includes a lever 196 and a lever 198 having opposed flat surfaces which engage opposite portions of a bearing 122. The bearing 122 is carried at the end of a rod 200, which is moved laterally by a barometric control shown diagrammatically at 120. The rod 112 is pivoted to the lever 196. The lever 198 is pivoted near its center at 202, and the spring 116 acts upwardly on its right end. The lower end of spring 116 engages a retainer 204 which is positioned by cam follower 128.

Cam 118 is fixed on a hub 206, which is in turn keyed to the main control shaft 95 for rotation therewith. The connection of hub 206 to shaft 95 permits longitudinal movement of hub 206 along the shaft. The cam 118 has two cam surfaces 208 and 210, of different contours. These two cam surfaces lie side by side on the cam 118, so that the particular cam surface engaged by follower 128 is determined by the lateral position of the cam. The left end of hub 206, as it appears in the drawing, is extended to form a piston 212 within a cylinder 214. The end of piston 212 is provided with a flange, and a compression spring 216 retained between that flange and the cylinder 214 biases the piston to the left within the cylinder. Hydraulic fluid under pressure may be supplied to the cylinder 214 through conduit 218, and is controlled by control valve mechanism 124.

The valve mechanism 124 includes a piston valve 220 operated by a bellows 224 located in a chamber 226. The pressure of the water or other combustion regulating fluid being supplied to the combustion chambers of the engine is communicated to chamber 226 through conduit 52. A spring 228 biases valve 220 to the position shown in the drawing, in which conduit 218 is in direct communication with a drain conduit 230. When water under pressure is supplied to chamber 226, bellows 224 and spring 228 are compressed, thereby moving valve 220 upwardly so as to connect conduit 218 to a conduit 232 which is supplied with hydraulic fluid under pressure through conduits 234 and 236. When fluid under pressure is admitted through conduit 218 into cylinder 214, the piston 212 is moved to the right, thereby moving the cam surface 208 under the follower 128, so that the force of spring 116 is determined by the contour of cam surface 208, rather than by the contour of cam surface 210. When water is not being supplied to the engine, the spring 228 moves valve 220 to the position shown in the drawing, and the conduit 218 is connected to drain conduit 230. Spring 216 then moves the cam 118 to the position shown, wherein follower 128 rides on the cam surface 210. The engine is capable of developing greater power and hence carrying a greater load when the combustion modifying fluid is being supplied to the engine. Hence the contour of cam surface 208 is such that the force of spring 116 is increased when follower 128 is riding on that cam surface.

Provision is made for reducing the torque load on the engine whenever the engine speed falls below the value for which the pilot's manual control lever is set. This lever rotates the shaft 95 which carries a cam 238 operating a follower 240 which controls the speed setting of the governor schematically indicated at 130. The governor is rotated by the engine driven shaft 96. When the engine speed falls below the value determined by the position of follower 240, the governor 130 operates to lower a rod 242, which is connected through a strain relief spring 244 to another rod 246. The rod 246 extends upwardly through an opening in the lever 198 and is provided at its upper end with a flange 248. When the rod 246 is moved downward because the engine speed falls below the desired value, the flange 248 engages the upper surface of lever 198, rotating it clockwise, and thereby reducing the spring force acting downwardly on valve 108. This operates the torque control system to partially unload the engine, and thereby allows the speed to recover its desired value more quickly.

The control shaft 95 also carries a temperature reset cam 250 and a fuel cam 252. The fuel cam 252 positions a follower 254 which determines the rate of flow of fuel to the engine. The follower 254 also carries an arm 256 which extends between a pair of push rods 258 and 260.

The push rods 258 and 260 are positioned by the fluid motor device 132 in the temperature override control mechanism. This control mechanism operates to reduce the torque load on the engine and to reduce the fuel flow whenever the tail pipe temperature exceeds a predetermined value.

The fluid motor device 132 includes a piston 262 moving in a cylinder 270. The lower end of piston 262 is provided with a gear 272, driven by the engine, so that the piston is continuously rotated. A spring 274 biases the piston 262 upwardly against the pressure in cylinder 270. A lateral surface of piston 262 is provided with one or more slots 276 extending downwardly from the upper end of the piston. As the piston rotates, these slots 276 provide intermittent communication between fluid supply conduits 278 and 280 and the cylinder 270. The conduit 280 is normally closed by a valve 282 controlled by the temperature reset cam 250. An outlet conduit 283 is provided for the chamber 270, which outlet conduit is controlled by a thermostatic valve, diagrammatically indicated at 284, subject to the temperature in the tail pipe of engine. The construction of the valve is such that it is normally closed when the tail pipe temperature is in the allowable range of values. The valve 284 opens whenever the tail pipe temperature exceeds the desired value, thereby reducing the pressure above the piston 262 in the cylinder 270. The spring 274 then moves the piston upwardly, carrying with it the push rods 258 and 260. Push rod 260 acts through a strain relief connection 286 and a push rod 288 on the right end of a lever 290. A rod 292 extends upwardly from the left end of lever 198 and through an aperture in the lever 290. The rod 292 is flanged at its upper end as indicated at 294. When the temperature control moves the rod 288 upwardly, the lever 290 is carried upwardly, so that it engages the flange 294 and moves rod 292 and lever 198 upwardly, in a torque decreasing direction. At the same time, the upward movement of push rod 258 is transmitted through arm 256 to the fuel control mechanism to reduce the engine temperature.

In emergency conditions, it is desired to increase the upper limit of power output by increasing the maximum permissible temperature. This is done by the temperature reset cam 250. When the pilot's manual control lever is moved to its maximum power position, the cam 250 opens valve 282, thereby providing an additional supply of hydraulic fluid to the cylinder 270, and increasing the pressure therein. Under such conditions the valve 284 which is subject to the tail pipe temperature has to open wider in order to reduce the pressure in cylinder 270 to a point where the push rod 258 and the related temperature control mechanism are operated to reduce the torque load and the fuel supply.

The terms and expressions used herein are employed for purposes of description and not of limitation, and I have no intention, in the use of such terms and expressions, of excluding any equivalents of the features shown and described or portions thereof, but recognize that various modifications are possible within the scope of the invention claimed.

I claim as my invention:

1. A spool valve comprising a valve member having a pair of lands, separated by a recess, a pair of cylindrical seat members, each having a central bore to receive said valve member and a larger bore concentric with said central bore and extending inwardly from one end, and a sleeve having locating faces in its opposite ends and longer than the combined depth of the larger bores of both said seat members, said seat members and said sleeve being assembled with said larger bores aligned and said sleeve received in said larger bores, said sleeve being effective to maintain the adjacent ends of said seat members spaced apart, said seat members having ports extending through the walls of said larger bores adjacent to the inner ends thereof, said sleeve having radial grooves cut in said locating faces to provide valve ports, the distance between the bottoms of the grooves at one end of said sleeve and the bottoms of the grooves at the other end being equal to the distance between said valve lands, said grooves communicating with said ports in the seat members, and said sleeve having a port extending therethrough to provide fluid communication with the recess between said lands.

2. A spool valve as in claim 1, in which the port extending through said sleeve communicates with the space between the adjacent ends of said seat members, and fluid conduit means communicating with said space.

3. A spool valve as in claim 1, in which said sleeve has annular recesses at the periphery of each of said locating faces to provide fluid communication between said grooves and the ports in said seat members.

4. A spool valve as in claim 1, in which said valve has a pair of additional recesses on the opposite sides of said lands, and in which each seat member is provided with a port communicating with the adjacent one of said additional recesses.

5. A spool valve as in claim 4, in which said lands are substantially longer than the ports formed by said grooves, in which each land is provided with at least one tapered notch having its base at one edge of said land and its apex at a point spaced from the other edge of said land by a distance substantially equal to the depth of said grooves, and which includes means for rotating said valve continuously, so that upon translation of said valve from an intermediate position, the grooves in one end of said sleeve are intermittently connected to one of the recesses on said valve.

6. A spool valve as in claim 5, in which the notches on said lands have their apexes oppositely directed so that upon translation of said valve from an intermediate position, the grooves in one end only of said sleeve are intermittently connected to one of the recesses on said valve, while the grooves in the other end are continuously connected to another of the recesses.

7. A spool valve, comprising a valve member having a pair of lands separated by a recess and having a pair of additional recesses on the opposite sides of said lands, a cylindrical seat for said valve having a pair of delivery ports spaced the same distance apart as said lands so as to be closed thereby when said valve member is in an intermediate position, said seat having other ports communicating with said recesses in all positions of said valve, and means for continuously rotating said valve, said lands being substantially longer than said delivery ports, and each said land having at least one tapered notch having its base at one edge of said land and its apex at a point spaced from the other edge of said land, the tapered notch on one land having its apex directed oppositely from the apex of the tapered notch on the other land, so that upon translation of said valve from said intermediate position, the ports adjacent one only of said lands are intermittently connected to one of the recesses on said valve, while the ports adjacent the other of said lands are continuously connected to another of said recesses.

References Cited in the file of this patent

UNITED STATES PATENTS

| | | |
|---|---|---|
| 1,908,396 | Albright | May 9, 1933 |
| 1,967,851 | Wilson | July 24, 1934 |
| 2,124,274 | Nichols | July 19, 1938 |